United States Patent Office 3,367,235
Patented Feb. 6, 1968

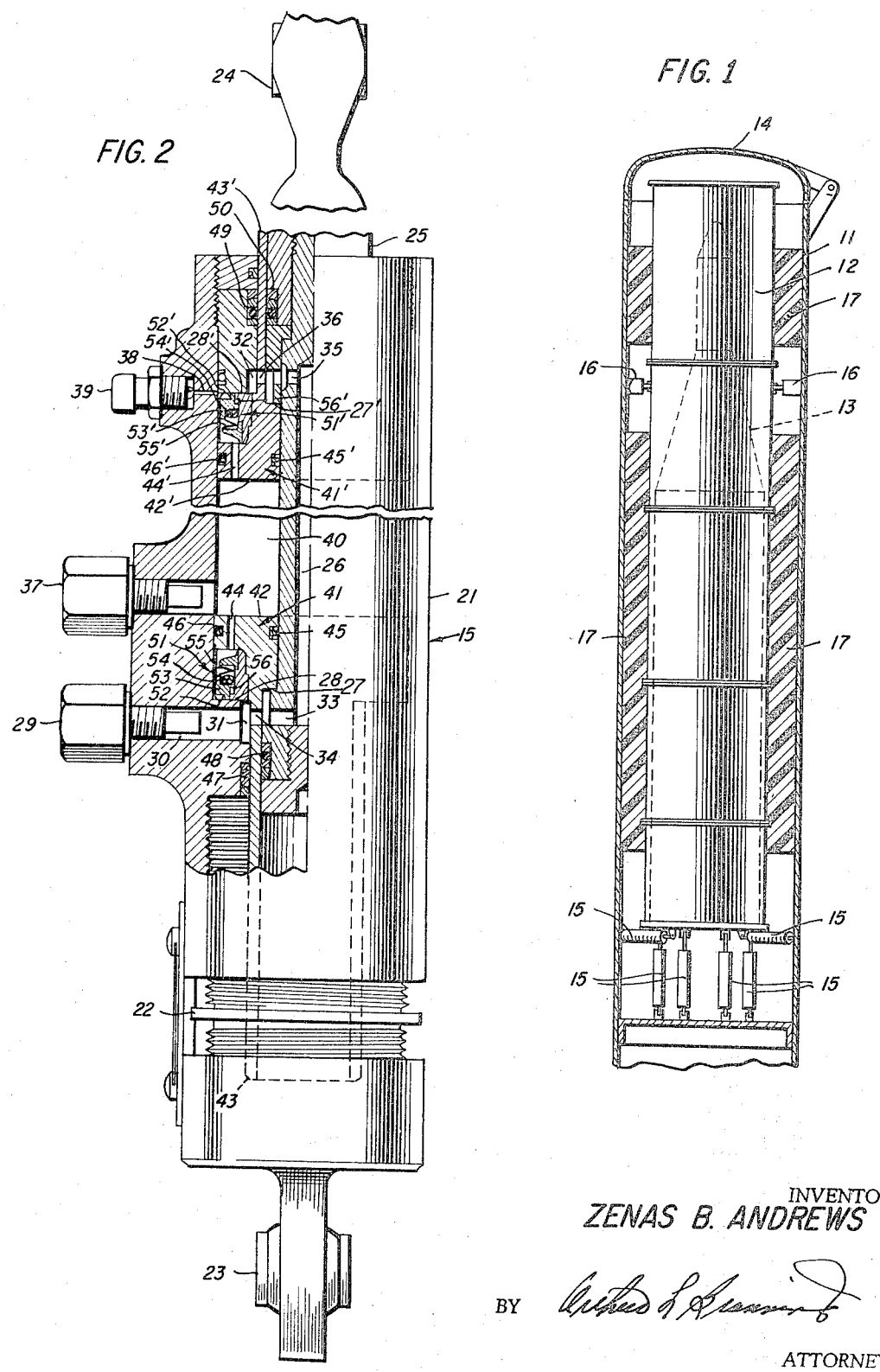

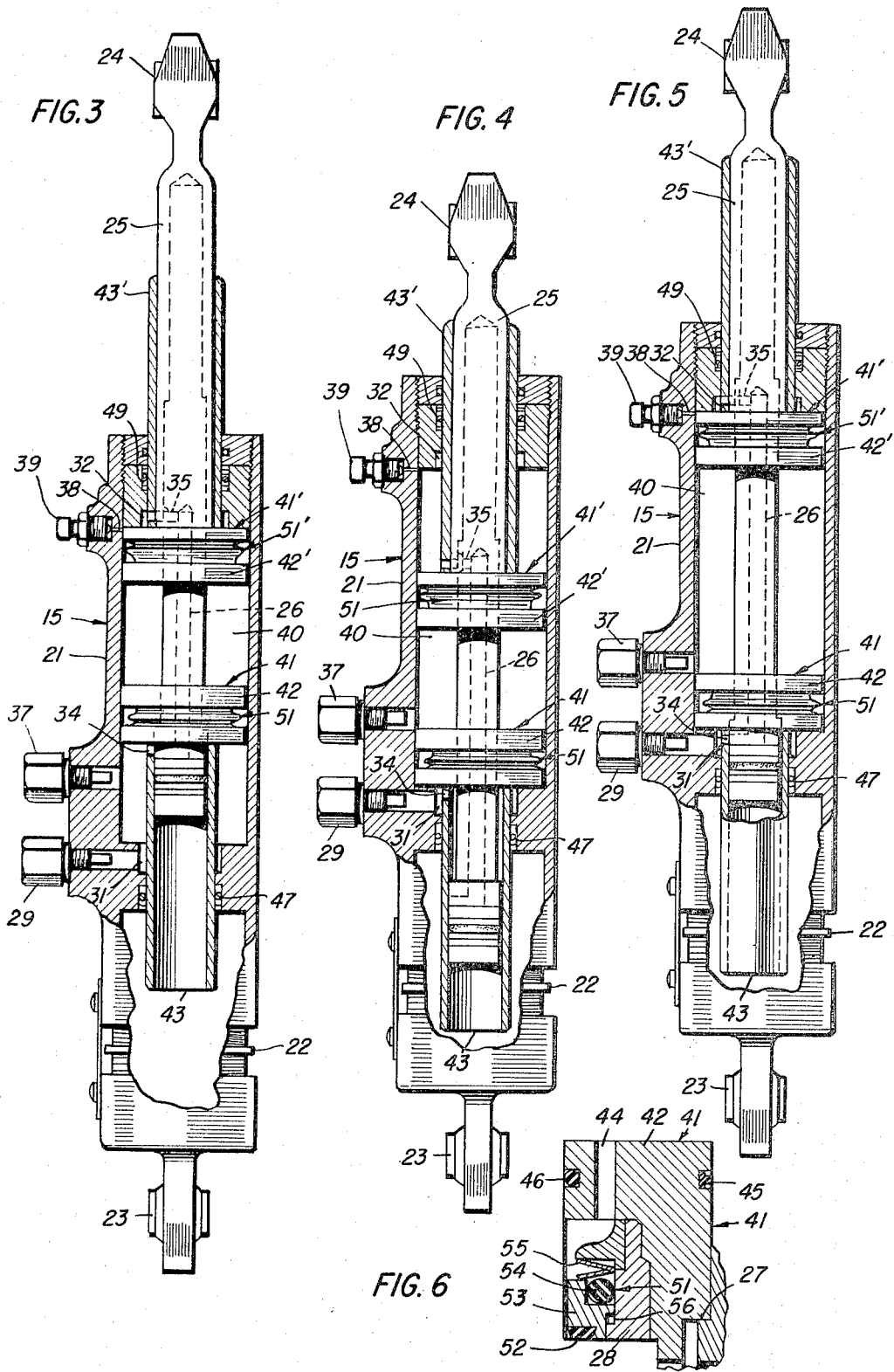

3,367,235
BREAKING LIQUID SPRING SUPPORT WITH DORMANT LOCKOUT
Zenas B. Andrews, Los Altos, Calif., assignor, by mesne assignments, to the United States of America as represented by the Secretary of the Navy
Filed May 13, 1966, Ser. No. 551,178
10 Claims. (Cl. 89—1.816)

This invention relates generally to a means for isolating a mass from destructive shock forces and from vibration and more particularly to a liquid spring of the double acting type.

In order to both support a weighty and bulky mass and to isolate it from shock and vibration, various means such as hydraulic springs have been heretofore devised which employ interconnected fluid pressurization lines and valving for producing the required lockout within the spring cylinder. When the mass is a missile stored within a launch tube resiliently supported within an outer tube, lockout launch preparation evolutions and hydraulic pressurization of the lockout cylinders prior to missile launch was required. An improvement over such a system produced a self-contained double acting liquid spring designed to resiliently support an inner missile tube or some other mass. However, such springs have proven somewhat inefficient because they fail to provide sufficient dampening upon severe shock. Above all, the shock compensating means heretofore available is unable to both rigidly support a weighty mass while at the same time attenuate destructive external compression and tension forces, low force and vibrational forces.

Many of the inherent disadvantages in liquid springs heretofore used are obviated by the instant invention since a liquid spring has been developed which will not only act as a rigid connection for the supported mass, but will also function as a vibration dampening device, a shock attenuation spring and a low force cushion, without the use of any additional shock absorbing material.

Accordingly, when the instant breakaway liquid spring is used in a missile launching system, the springs are in a locked position during normal cruising thereby allowing the launch tube to remain in alignment during all conditions of pitch and roll without motion of the launch tube within the vehicle occurring. Hydraulic seal wear, foam fatigue and ball joint wear will therefore be prevented. Also, since a prelaunch preparation is not required, lockout launch preparation panel circuits are eliminated.

It is therefore an object of this invention to provide a liquid spring which is capable of resiliently resisting both tenson and compression forces.

Another object of this invention is to provide a breakaway liquid spring of the double-action type which will rigidly support a mass while in a locked or static position and which will break or respond upon the application of compression or tension forces and thereafter rebound to its locked position.

A further object of this invention is to provide a missile launcher shock support which does not require prelaunch preparation and which requires only minimal maintenance during normal vehicle cruising.

A still further object of this invention is to provide a breakaway liquid spring, several of which are vertically disposed for both support and shock isolation for a missile launch tube and several more of which are disposed for horizontal centering and for maintaining launch tube azimuth of a launch tube within a mount tube.

A still further object of this invention is to provide a breakaway liquid spring which is operable to absorb destructive shock forces as well as low forces and low amplitude high frequency vibrations.

A still further object of this invention is to provide a liquid spring which comprises a hollow cylinder closed at one end, a hollow rod disposed therein and projecting through the cylinder's other end, pistons within the cylinder disposed about the rod thereby defining an inner fluid filled chamber, seal assemblies, and an outer fluid filled chamber which communicates with the inner chamber through damping orifices in the piston heads after seals breakaway upon the movement of a piston responding to the application of either tension or compression forces.

A still further object of this invention is to provide a liquid spring which is capable of attenuating vibrations wthout causing a breakaway of the seals by means of a floating ring located within each of the seal assemblies.

Other objects, advantages and novel features of the invention will become apparent from the following detailed description of the invention when considered in conjunction with the accompanying drawings wherein:

FIG. 1 is a vertical cross-sectional view of a typical ballistic missile launching tube showing breakaway liquid springs interconnecting the inner tube to the outer tube;

FIG. 2 is a side elevation partially longitudinal section of the breakaway liquid spring partly broken away showing the spring in its locked position;

FIG. 3 is a side elevation partially in longitudinal section showing the liquid spring its extended position after responding to a tension force;

FIG. 4 is a view similar to FIG. 3 showing the position of the elements when the spring is in its compressed position;

FIG. 5 is a view similar to FIGS. 3 and 4 showing the instant liquid spring in its static or locked position;

FIG. 6 is a detail view greatly exaggerated of part of the tension piston head and its associated breakaway seal assembly.

FIG. 1 illustrates a typical environment for the present invention, and more specifically, it discloses a cross-sectional view of an outer launch tube 11; the launching vehicle being omitted for purposes of clarity. A missile 13 is positioned in the missile launching system which has its upper portion covered by a latch 14. Each missile launching system includes an outer tube 11 which has resiliently mounted therein an inner tube 12. The missile 13 is ejected from the inner tube 12 when high pressure fluid is released from a flask (not shown). The fluid pressure is controlled and fed into the lower portion of the launching system in the conventional manner. Vertical axis breakaway liquid springs 15 act as vertical supports for the launch tube and vertical launch tube shock isolation. Because these springs are vertical and parallel to each other, shock motion bending moments caused by the existing asymmetrical vertical spring arrangement (shown by Price et al. in Patent No. 3,221,602) will be eliminated. Springs 15 are capable of supporting the gross weight of the missile and launch tube when charged to a pressure of about 7000 pounds per square inch. Each is a double acting self-centering spring the details of which will be described hereinafter.

Lower level horizontal axis breakaway liquid springs 15 are for horizontal centering of the launch tube and for maintaining launch tube azimuth and pitch and roll alignment. Each is a double acting self-centering spring similar to the vertical springs, and may be charged to 5000–7000 p.s.i., with the stroke and distance between clevis pin centers being similar to that of the vertical springs. Horizontal springs 15 have a sufficient centering force after breakaway to return the launch tube back into azimuth.

Upper level horizontal springs 16 may be of a single acting design, not described in the drawings. These springs have a stroke similar to spring 15 and may be charged to a pressure of 5000–7000 p.s.i. The springs may be interconnected with a common hydraulic line so that breakaway of any one spring will release the remaining springs. Horizontal centering of the launch tube within the mount tube is therefore maintained.

Foam supports 17 are for horizontal launch tube shock isolation and are identical to those designs for existing support systems.

Springs 15 and 16 therefore, resiliently support the inner tube 12 within the outer tube 11 thereby isolating the missile 13 from large external forces such as the shock from an explosion.

FIGS. 2 through 6 illustrate the unique concept of the breakaway liquid spring. It is termed "breakaway" since it breaks-away from its centrally locked position of FIG. 2 or FIG. 5 only when subject to sudden and severe shocks, for example, depth charges or the like. It is then capable of resiliently resisting shock in both directions from its locked or static position.

The spring 15 consists of a spring body or outer cylinder 21 adjustable lengthwise by means of turnbuckle 22. Body 21 is capped at one end and has thereon a spherical bearing 23. Into the open end of body 21 projects a shaft 25 having on its one end a spherical bearing 24 which, together with bearing 23, facilitates spring attachment to launch tube mounting base clevises, not shown. Of course, the connecting means for spring 15 may be of any conventional type depending upon its intended use.

Cylinder 21 contains two piston assemblies: tension 41 and compression 41'. (Similar numerals with a prime (') will be used to describe similar elements of the spring.) These piston assemblies within body 21 are slideably disposed about shaft 25, and cooperate to define a central chamber 40 which contains a compressible fluid such as silicone oil, or its equivalent. The chamber 40 is charged through charging connection 37 and entrapped air is removed through a bleed fitting 39. This fluid acts to lock the piston assemblies against their respective shoulders 28, 28' which extend inwardly from the body 21. Each piston assembly respectively comprises: radial piston heads 42, 42' extending into engagement with the outer wall of shaft 25 and the inner wall of body 21; sleeves 43, 43' forming extensions of said piston heads and slideable between seals 47, 48 and 49, 50; damping orifices 44, 44'; and piston rings 46, 46'. An outer chamber 30 is provided in the outer cylinder 21 which consists of annular passages 31, 32 interconnected by a bore 26 of shaft 25 through ports 33, 34 and 35, 36. When the spring is in its static position of FIG. 2 and FIG. 5, and in its extend position of FIG. 3, port 34 in sleeve 43 is in axial alignment with port 33 in the wall of bored shaft 25. When the spring assumes a compressed position as in FIG. 4 and during its static position of FIG. 2 and FIG. 5, port 36 in sleeve 43' is in axial alignment with port 35 in the wall of bored shaft 25. This outer chamber 30 is filled with a like compressible fluid as in chamber 30 and is charged through charging connection 29. Four seals hold the fluid within central chamber 40: shaft seals 45, 45' and breakaway seal assemblies 51, 51'. Each assembly consists of a seal 52 and 52', a floating ring 53 and 53', an O-ring 54 and 54' and a Belleville or V-shaped annular spring 55 and 55'. Fluid is contained within the outer chamber 30 by means of high pressure seals 47, 48, 49 and 50.

In operation, fluid within chamber 40 is pressurized via connector 37 thereby forcing sleeves 43 and 43' out through the high pressure seals 47, 48, 49 and 50. This pressurization imparts a force which causes the spring 15 to assume its fixed length between its spherical bearings, the locked position of FIG. 2 and FIG. 5. This force is known as an alignment force in that it is the force that pushes the object connected to the spring into its properly stowed position of alignment. The stowage pressure within chamber 40 can be relatively low for a liquid spring since the area enclosed by breakaway seals 52 and 52' is relatively large compared to the area enclosed by the piston sleeves 43 and 43'. The result is that a large force is required to open either breakaway seal 52 or 52' even though the central chamber pressure is relatively low. The stowage pressure within the outer chamber 30 can be of any value less than central chamber 40 pressure. When outer chamber 30 pressure exceeds central chamber 40 pressure, the breakaway seals 52 and 52' lift as check valves by compressing Belleville springs 55 and 55'. This check valve feature facilitates bleed down through bleed port 38, in that bleed off of the central chamber 40 results in the corresponding bleed off of outer chamber 30. Both charging connections 29 and 37 normally contain check valves and therefore bleed down cannot be accomplished through these fittings.

Two types of damping are inherent in this spring. The first type, coulomb damping, is caused by friction between sleeves 43 and 43' and seals 47, 48 and 49 50, respectively. The second type, viscous damping, is a function of flow through damping orifices 44 and 44'. When the spring is compressed upon sufficient breakaway pressure due to a large external force, the compression piston 42', is pushed into the central chamber 40, FIG. 4, by means of an outward extension on shaft 25 defining a shoulder 27'. This first motion results in equalization of fluid pressure between the central chamber 40 and outer chamber 30 subsequent to the opening of the breakaway seal 52'. This equalization yields a relatively low cylinder fluid pressure. As the compression piston 42' moves into the central chamber 40, the decreasing volume of the fluid within chamber 40 increases fluid pressure, the basic liquid spring principle, and causes fluid to move through the damping orifice 44'. Damping combined with the above-noted low pressure results in an approach to a linear type of liquid spring with a negligible force discontinuity or jerk as the spring passes through its central or locked position, FIG. 4, when absorbing shock motion. The decrease in fluid volume, and resultant increases in fluid pressure is a function of the cross-sectional area of compression sleeve 43' and the volume of chambers 30 and 40. Fluid damping and seal friction can dynamically reduce force discontinuities to zero when the spring passes through its locked position. Thereafter, fluid pressure imparts a spring return force upon the compression piston sleeve 43'. This force drives the spring back to its central locked position, FIG. 2 and FIG. 5.

When the spring is extended, FIG. 3, upon breakaway due to a large external tension force, shaft 25 with its outwardly extending flange defining shoulder 27 engages with piston head 42 (see FIG. 6), and pulls head 42 and tension sleeve 43 into the central chamber 40. This, in the same manner as in the compression cycle described above, imparts a spring return force which drives the spring back to its central or locked position of FIG. 2 and FIG. 5.

By design, the breakaway seals will separate only when an external shock force exceeds the lock force produced by pressurizing the fluid within chamber 40. The locking force, when the instant spring is used as in FIG. 1, is sufficient to prevent launch tube motion during missile launch, and to prevent launch tube movement during the specified maximum sea state. After residual pressure within each cylinder 21 forces the launch tube into alignment, the breakaway seals should be repressurized or relative motion between the launch tube and the vehicle will occur when ship roll exceeds the residual breakaway centering force.

Another unique feature of the instant invention is its ability to avoid low force breakaway. The Belleville springs 55, 55', as part of seal assemblies 51, 51', insure the containment of fluid within chamber 40 by forcing breakaway seals 52, 52' against the seal face of inwardly extending shoulders 28, 28'. O-rings 54, 54' seal the bore of the floating rings 53, 53' which float in order to accommodate normality deviations between breakaway seals 52, 52' and shoulders 28, 28'. Therefore, those external loads having magnitudes less than needed for breakaway will nevertheless be attenuated because gaps 56, 56' will allow a slight movement of piston head 42 or 42' into the chamber 40. Breakaway seals 52, 52' will not lift unless the external force is sufficient to continue movement of head 42 or 42' after one of the gaps 56, 56' is closed. The motion of either the tension piston 42 or the compression piston 42' throughout the distance predetermined by gap 56 or gap 56', provides a cushioning protection against a low force which would otherwise cause breakaway to occur. These low forces can be caused by an uneven distribution of load of several breakaway springs in a redundant system; roll and pitch of ships motion shock due to shipboard gunfire; or any other shock pulse or force that is less than the designed breakaway force of the spring.

The above noted cushioning protection provided by the spring's axial motion can also provide vibration attenuation. Such may be accomplished in any resiliently supported mass using springs of the instant invention, by adjusting two or more opposing horizontally disposed springs in a redundant system, by means of turnbuckle 22 so that there is no metal-to-metal contact under vibrations between pistons 42, 42' and shoulders 28, 28'. Gaps 56, 56' of floating rings 53, 53' are kept open thereby providing an oil cushion along the spring axis. By such an adjustment, opposing pairs of breakaway liquid springs are essentially floating on oil without metal-to-metal contact along the spring axis. An alternate adjustment for vibration protection is to pressurize the vertical springs under the supported mass, so that the mass is lifted to offset gravity and thereby preclude metal-to-metal contact between pistons 42, 42' and shoulders 28, 28' under vibration.

The breakaway liquid spring of the instant invention has a wide variety of applications where a supported mass must be isolated from destructive shock and vibrational forces. These may include objects such as steam turbines, diesel engines, motor generator sets, radars, ordnance, computers and optical range finders. Should the suported mass require typical connecting objects such as a shaft or a pipe, special fittings that yield under shock motion would be required in order to prevent broken alignment by the destructive external shock. Special fittings could include full floating shaft couplings and flexible pipe connections.

From the above, it is evident that a novel breakaway liquid spring of general application has been invented which owes its uniqueness to its ability to remain hydraulically locked in a static position while rigidly supporting a given mass, and yet provide shock absorption with linear damping characteristics in the presence of destructive external shock forces of compression or tension. Also, the instant spring is capable of attenuating vibration forces and providing a cushioning protection against low external forces. Therefore this spring could have applications in any field where both shock attenuation and static stability are desired parameters.

Obviously many modifications and variations of the present invention are possible in light of the above teachings. It is therefore to be understood that within the scope of the appended claims the invention may be practiced otherwise than as specifically described.

What is claimed is:

1. A double acting spring comprising an outer cylinder having a bore;
    first attaching means on one end of said cylinder for connection to a load to be spring action controlled;
    a rod slideably retained within said cylinder bore;
    second attaching means on one end of said rod remote from said first attaching means;
    piston means comprising first and second pistons each having heads and integral piston sleeves slideably retained within said cylinder bore, telescopically disposed about said rod and defining with said cylinder and said rod a chamber completely filled with fluid;
    each piston head having at least one damping orifice therethrough;
    said cylinder having an outer fluid filled chamber separated from said inner chamber by said piston means; and
    high pressure seals disposed on either side of said piston sleeves, said piston means being engageable with said rod such that application of increased tension and compression forces will cause movement of said piston means into said inner chamber thereby displacing fluid from said inner chamber to said outer chamber through said orifices whereby a damping effect is produced as said piston means both frictionally slide between said high pressure seals and as said piston means reduce the volume within said inner chamber and effect an increase in pressure therein.

2. The spring of claim 1 wherein said first and second pistons, respectively, are retained within said cylinder bore by first and second inwardly extending shoulders on said cylinder.

3. The spring of claim 2 further comprising first and second seal assemblies respectively disposed between said shoulders and said piston heads.

4. The spring of claim 1 wherein said outer chamber comprises first and second annular passages and said rod has a fluid filled bore therein interconnecting said passages.

5. The spring of claim 3 wherein each of said seal assemblies comprises:
    a breakaway seal;
    a floating ring;
    an O-ring; and
    an annular V-shaped spring.

6. The spring of claim 5 wherein said floating ring has a shoulder thereon and said piston heads have shoulders thereon in mating engagement with said ring shoulders after movement of said piston means thereby causing said seals to break away and allow said inner chamber fluid to communicate with said outer chamber fluid.

7. The spring of claim 4 wherein said rod has an outwardly extending flange on its other end in mating engagement with said first piston head whereby said first piston is made to move into said inner chamber upon application of tension force.

8. The spring of claim 4 wherein said rod has an outwardly extending flange near said one end in mating engagement with said second piston head whereby said second piston is made to move into said inner chamber upon application of compression force.

9. The spring of claim 6 wherein said piston shoulders are normally out of engagement with said ring shoulder such that upon application of only slight tension and compression forces, said piston means is permitted slight movement without causing said seals to breakaway.

10. The spring of claim 1 in combination with an outer storage tube and an annularly disposed inner launch tube, said spring acting as a shock isolating means connecting said tubes.

References Cited

UNITED STATES PATENTS

| | | | |
|---|---|---|---|
| 2,985,443 | 5/1961 | Smith | 267—1 |
| 3,221,602 | 12/1965 | Price et al. | 89—1.816 |

SAMUEL W. ENGLE, *Primary Examiner.*